UNITED STATES PATENT OFFICE.

JOHN W. GALLUP, OF DENISON, TEXAS.

MANUFACTURE OF ARTIFICIAL STONE.

SPECIFICATION forming part of Letters Patent No. 290,765, dated December 25, 1883.

Application filed October 2, 1883. (No specimens.)

*To all whom it may concern:*

Be it known that I, JOHN W. GALLUP, a citizen of the United States, and a resident of Denison, in the county of Grayson and State of Texas, have invented certain new and useful Improvements in the Manufacture of Artificial Stone; and I do hereby declare that the following is a full, clear, and exact description of the invention, which will enable others skilled in the art to which it appertains to make and use the same.

My discovery relates to the manufacture of artificial stone; and it consists in a process embracing five steps—viz., first, in preparing the water for dampening the materials used; second, in mixing the materials; third, in molding the same; fourth, in sprinkling the molded stone; and, fifth, in painting the stone with a solution of isinglass, for the purpose of rendering the stone impervious to water.

For the water used in mixing the materials I take one and one-half ounce of lamp-black, which is dissolved well in four ounces of alcohol, which solution is again diluted with one pint of cold water. One-half ounce of isinglass is thereupon put into one pint of cold water and heated until well dissolved, whereupon this solution is added to the dissolved lamp-black, and four ounces of sesquioxide of iron added. The entire solution is stirred up in a barrel of water. Three parts of fine gravel and one part of cement are now mixed together and dampened with the prepared water to a consistency of damp earth, and two parts of sand and one part of cement are likewise mixed and dampened to the same consistency and both mixtures sifted and worked to insure perfect mixture of the gravel and cement and the sand and cement. The mold is thereupon prepared to receive the mixtures, when the mixture of sand and cement is first filled into the mold and spread well, forming the outer side of the stone, whereupon the gravel-and-cement mixture is filled in, forming the core of the stone. About twelve hours after the stone has been molded it is sprinkled with a solution of two-thirds ounce of isinglass added to one quart of cold water, and heated until dissolved, and added to one barrel of water, which sprinkling is continued for five days three times a day. After the stone has been molded for about seven days, the entire surface is painted with a solution of one and one-fourth ounce of isinglass dissolved over heat in one gallon of water and added to one barrel of water, whereupon the stone is ready to be used, the last painting making the surface of the same entirely impervious to water.

What I claim is—

1. The process of manufacturing artificial stone, consisting in mixing gravel and sand separately with cement and with water containing lamp-black, isinglass, and sesquioxide of iron, in about the proportions stated, filling the mold with the mixed materials, placing the sand-and-cement mixture upon the bottom and sides of the mold, and the gravel-and-cement mixture inside the former mixture, sprinkling the molded stone with a solution of isinglass, and at last painting it with a thicker solution of the same, as described.

2. The artificial stone consisting of an outer shell of a mixture of sand and cement, mixed with a solution of isinglass, lamp-black, alcohol, sesquioxide of iron, and water, and an inner core of gravel and cement mixed with the same solution, sprinkled with a solution of isinglass and water, and painted with a similar but stronger solution, all used in about the proportions stated.

In testimony that I claim the foregoing as my own I have hereunto affixed my signature in presence of two witnesses.

JOHN W. GALLUP.

Witnesses:
J. M. COOK,
H. TONE.